United States Patent [19]

Hollis, Jr. et al.

[11] 4,357,122
[45] Nov. 2, 1982

[54] INSERTED BLADE END MILL

[75] Inventors: Thomas Hollis, Jr., Peterborough; Harold F. Armstrong, Milford, both of N.H.

[73] Assignee: The O.K. Tool Company, Inc., Milford, N.H.

[21] Appl. No.: 217,247

[22] Filed: Dec. 17, 1980

[51] Int. Cl.³ .............................................. B26D 1/12
[52] U.S. Cl. .................................... 407/42; 407/51; 407/63
[58] Field of Search ...................... 407/40, 41, 42, 33, 407/34, 37, 50, 51, 63

[56]  References Cited

U.S. PATENT DOCUMENTS

| 1,290,042 | 1/1919 | Arnold | 407/51 |
| 2,173,848 | 9/1939 | Kraus | 407/42 |
| 2,173,868 | 9/1939 | Weddell et al. | 407/37 |
| 3,715,788 | 2/1973 | Ayer | 407/37 |
| 4,265,324 | 5/1981 | Dick | 407/34 |

FOREIGN PATENT DOCUMENTS 1016093  9/1957  Fed. Rep. of Germany ........ 407/63

Primary Examiner—Leonidas Vlachos
Attorney, Agent, or Firm—James H. Grover

[57]  ABSTRACT

In inserted blade rotary end mills having tapered blades inserted in axially extending tapered sockets. The improvement of providing longitudinal interfitting serrations on opposed surfaces of both the inserted blades and sockets to prevent twisting of the blades in the sockets.

3 Claims, 4 Drawing Figures

INSERTED BLADE END MILL

BACKGROUND OF THE INVENTION

This invention relates to rotary cutting tools for finishing bores in work pieces, and particularly to an inserted blade end mill. In end mills as well as larger diameter cylindrical mills, it is well known to use tapered blades inserted in sockets generally along the axis of rotation of the cylindrical cutter body. Longitudinal serrations on one side of the blades engage like serrations on sockets in the body to hold the blade from being thrown radially out of the body sockets under the forces of cutting. Such blades are quite satisfactory in large cylindrical bodys over three inches in diameter. But in the small diameters of approximately one half to three inches the sockets receiving the blades are so closely spaced that the remaining volume of the body between sockets is small and yielding. Consequently in small diameter end mills the blades tend to twist in their sockets and chatter, losing precision and greatly reducing their cutting efficiency. Multiple blade end mills under one inch in diameter are not feasible as previously made.

Accordingly it is the object of the present invention to provide practical, multiple inserted blade end mills in a diameter range of one half to three inches.

SUMMARY OF THE INVENTION

According to the invention an inserted blade end mill comprises a cylindrical shank of a diameter between approximately one half and three inches; a cylindrical cutter-holding body of approximately the same diameter as the shank extending axially from the shank, the body having a plurality of cutter sockets with opposed walls tapered lengthwise toward the shank; and a tapered cutter blade slidingly received in each shank socket and having two faces engaging the socket walls; wherein both blade faces have longitudinal serrations and both opposed socket walls have longitudinal serrations interfitting with the blade serrations, the serrations on both the blade and the socket walls running in parallel planes whereby the blades may be slidingly received and wedged in the sockets in the direction of the serrations, the interengagement of serrations at both blade faces preventing rotation of the blade in its socket.

Further according to the invention the blade has a helical cutting edge at the leading edge of the blade, which edge has a positive rake.

DRAWING

DESCRIPTION

Figure 1:
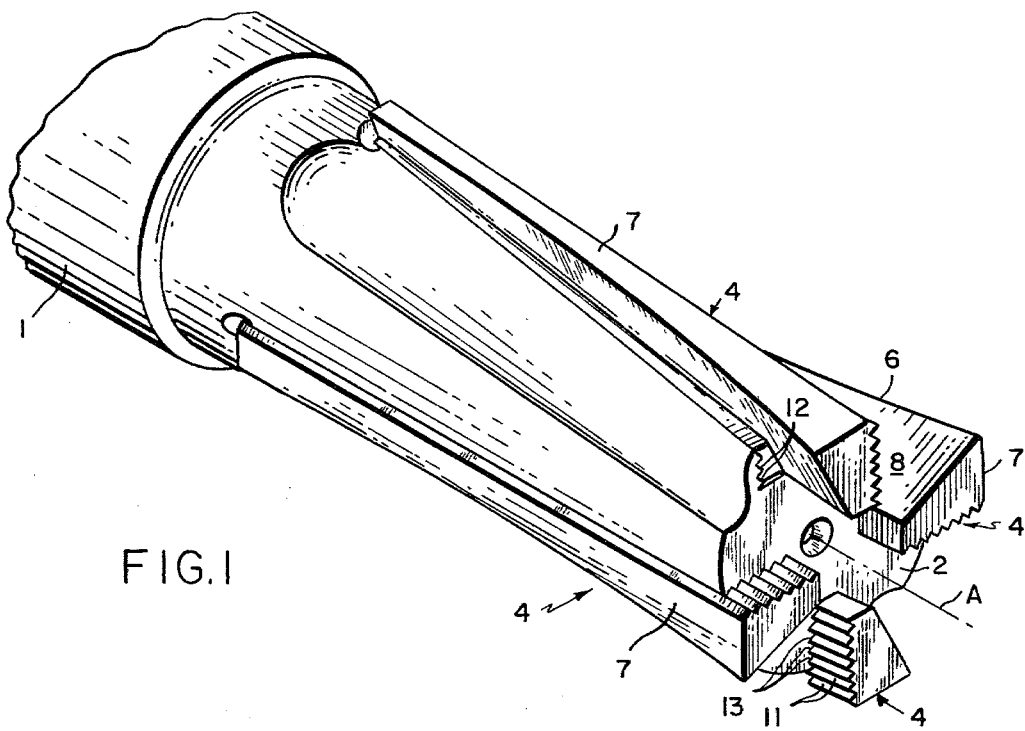
FIG. 1 is an isometric view of an end mill with inserted blades.
Figure 2:
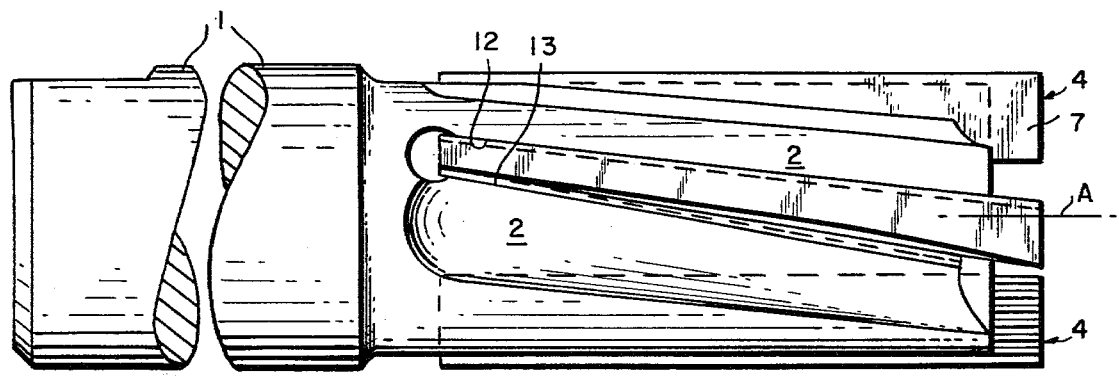
FIGS. 2 and 3 are side and end elevations of the end mill of FIG. 1.

As shown in FIG. 1 an end mill comprises a shank 1, cylindrical on an axis A, from which four posts 2 extend axially from the shank. The posts may or may not be joined at the central part of the end mill. The shank is one half to three inches in diameter. Between the posts are formed four elongate sockets 3, each inclined to the axis A of the end mill as best shown in FIG. 2. The sockets taper lengthwise toward the shank at an angle of approximately 3°, for example.

Figure 3:
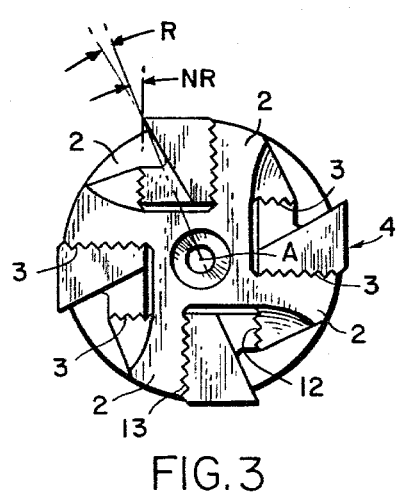
Figure 4:
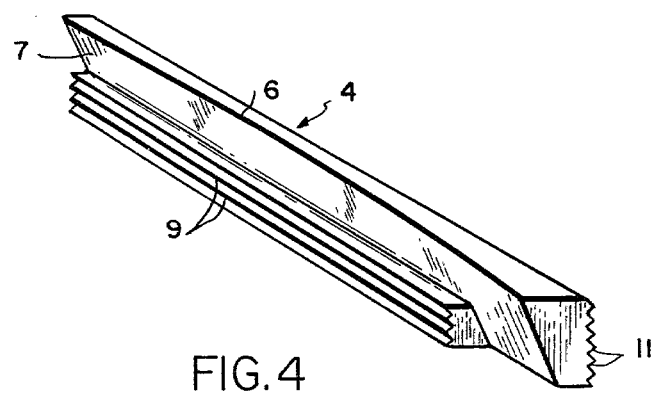
FIG. 4 is an isometric view of one inserted blade.

Inserted in each socket is an elongate cutting blade 4 which has the same taper as the sockets. Each blade has a helical cutting edge 6 formed by a curved surface 7 and a machined face 8, the surface 7 and face 8 being shaped to form the helical edge concentric with the axis A. As shown in FIG. 3 the helical shape of the cutting edge 6 allows the machined face 8 to be inclined at a positive rake angle R with respect to a radius from the axis A, notwithstanding the negative rake NR of the blade slot. On two opposite faces the blade has longitudinal serrations 9 and 11. The serrated faces taper lengthwise of the blade the same degree as the sockets which receive the blades. The serrations have a pitch of approximately 0.030 of an inch, and the two sets of serrations 9 and 11 lie or run in parallel planes. The blade serrations 9 and 11 precisely, slidingly interfit with serrations 12 and 13 on opposed walls of the sockets 3, which serrations are complementary to the blade serrations, having the same pitch and taper as those on the blade, and lying in parallel planes. In a blade two inches long the tolerance is about 0.002 inches maximum. To maintain this tolerance both serrations 9 and 11 of the blade are preferably cut by a numerically controlled machine in one set up of the blade, that is cutting passes are made on both faces of the blade without unclamping it from the cutting machine. Similarly opposite faces of each socket are cut in one set up.

The blades 4 are inserted in the sockets 3 of the end mill in the same way as with singly serrated blades. But in addition to an increase of resistance to radial displacement of the blades under cutting loads, in the present end mill there is a positive resistance to twisting or rotation of the blades in the sockets and consequent chattering. Two adjacent posts apply their gripping force to the opposite serrated faces of each blade, whereas with a singly serrated blade the unserrated face is free to slide and allow rotation. Furthermore with double serrations, insertion of the last blade in its socket exerts a force around the circumference of the posts adding to the grip of the other posts on the other blades. With a singly serrated blade the added force of insertion of the last blade would only cause flexing of the posts and slippage along the unserrated face without adding to the gripping force. The added blade gripping force, reduction of post flexing and reduction of blade chatter make possible the use of small end mills one half to three inches in diameter which hitherto were not feasible.

It should be understood that the present disclosure is for the purpose of illustration only and that this invention includes all modifications and equivalents which fall within the scope of the appended claims.

We claim:

1. An inserted blade end mill comprising:
   a cylindrical shank of a diameter between approximately one half and three inches;
   a cylindrical cutter-holding body of approximately the same diameter as the shank extending axially from the shank, the body having a plurality of cutter sockets with opposed walls tapered lengthwise toward the shank; and
   a tapered cutter blade slidingly received in each shank socket and having two faces engaging the socket walls;
   wherein both blade faces have longitudinal serrations and both opposed socket walls have longitudinal serrations interfitting with the blade serrations, the serrations on both the blade and the socket walls running in parallel planes whereby the blades may by slidingly received and wedged in the sockets in the direction of the serrations, the interengagement of serrations at both blade faces preventing rotation of the blade in its socket.

2. An end mill according to claim 1 wherein the sockets are formed by axial posts on each side of each socket, each blade engaging serrated faces of two posts.

3. An end mill according to claim 1 wherein the sockets extend at an angle to the axis of the shank, and each blade has a helical cutting edge formed by a face having a positive rake with respect to end mill.

* * * * *